United States Patent [19]

Kelly et al.

[11] Patent Number: 6,138,168
[45] Date of Patent: Oct. 24, 2000

[54] SUPPORT FOR APPLICATION PROGRAMS IN A DISTRIBUTED ENVIRONMENT

[75] Inventors: John Anthony Kelly, Hayling Island; Ian Michael McCallion, Romsey, both of United Kingdom

[73] Assignee: International Business Machines Corporation, Armonk, N.Y.

[21] Appl. No.: 08/707,934

[22] Filed: Sep. 10, 1996

[30] Foreign Application Priority Data

Sep. 12, 1995 [GB] United Kingdom ............ 9518564

[51] Int. Cl.[7] ............................................. G06F 9/00
[52] U.S. Cl. ........................ 709/300; 709/302; 709/100; 709/102
[58] Field of Search .............. 395/670; 709/100, 709/102, 300, 302

[56] References Cited

U.S. PATENT DOCUMENTS

| | | |
|---|---|---|
| 4,937,784 | 6/1990 | Massai et al. . |
| 5,136,585 | 8/1992 | Nizamuddin et al. . |
| 5,212,792 | 5/1993 | Gerety et al. . |
| 5,742,825 | 4/1998 | Mathur et al. . |

FOREIGN PATENT DOCUMENTS

| | | | |
|---|---|---|---|
| 0414624 | 2/1991 | European Pat. Off. .......... | G06F 9/46 |
| 0474339 | 3/1992 | European Pat. Off. .......... | G06F 9/44 |
| 0490636 | 6/1992 | European Pat. Off. . | |

OTHER PUBLICATIONS

Travostino, Untyped Mig: The Protocol, OSF/RI Operating Systems Collected Papers vol. II, 1993.

Bryant et al, A Task–To–Task Communication System for Multicomputer Systems, Norma IPC, OSF/RI Operating Systems Collected Papers vol. II, Oct. 1993.

Travostino et al Real–Time Local and Remote IPC: Architecture and Design, OSF/RI Operating Systems Collected Papers, Apr. 1994.

ACM Sigice Bulletin, vol. 20, No. 4, Apr. 1995, US, pp. 7–26, XP000525733, Paul Williams: "IBM MQSeries Commercial Messaging".

IBM Document No. SC33–0850–01 "MQSeries Message Queue Interface Technical Reference".

IBM Document No. GC33–0850–00 IBM Messaging and Queuing Series—An Introduction to Messaging and Queuing.

M. Frans Kaashoek et al., "An Efficient Reliable Broadcast Protocol", Dept. of Mathematics and Computer Science Vrije Universiteit Amsterdam, The Netherlands, vol. 23, pp. 5–19, Oct. 1989.

*Primary Examiner*—Lucien U. Toplu
*Assistant Examiner*—Hahn Nguyen
*Attorney, Agent, or Firm*—Jeanine S. Ray-Yarletts

[57] ABSTRACT

Provided are a system and method for supporting communication between application programs and the processing of messages by those programs. A table driven approach is used to select appropriate components of modular application programs to process received messages. The selection is carried out in dependence on associations between message types (e.g. request, inform, reply) and other characteristics of the message (e.g. whether the message is an expected reply as identified by an identifier value). Also used in said selection are dynamic characteristics of the message or the system (e.g. possibly expiry of a timeout, or the state of an application). Rules combine these criteria and determine the conditions for invoking an application program component.

Also provided is a mechanism for differentiating between reply messages which are received out of serial sequence but are still current and messages which are invalid.

11 Claims, 8 Drawing Sheets

SUPPORT FOR APPLICATION PROGRAMS IN A DISTRIBUTED ENVIRONMENT

FIELD OF INVENTION

The present invention relates to distributed data processing and communications, and more particularly to methods and systems for supporting the design, development and/or run-time execution of applications and supporting messaging communication between application programs.

BACKGROUND

The exchange of information between workers both within an organisation and between organisations using networks of computers is now commonplace. Increased use of networking and increased reliability and performance of networking and distribution systems has increased workers' efficiency by enabling fast access to shared data and has increased the cost effectiveness of data processing resources (e.g. by making expensive I/O devices available to a plurality of users in the network).

Networking has enabled data and processes to be distributed among data processing stations and to be located at whatever site within the network is most efficient. For example, locating some data near to the processes which access and update it, and locating certain processes at end user workstations, can reduce data traffic across the network; whereas storing at a central location a large database which is remotely accessed by a large number of users can simplify maintenance of consistency and provision of security. There is now a wide business requirement to be able to exploit the advantages of LANs and workstations without all data having to be dispersed to distributed systems, since the data management tasks such as provision of security and backup enterprise-wide access are much more expensive to achieve with distributed data than with centralised data.

A data processing model which provides advantages for distributed environments is client-server computing, in which 'client' programs send requests to one or more 'server' programs (which may be on a different system) and receive shared services from the server. A single business application may be distributed across multiple network sites and involve both client and server programs.

An application whose logic is distributed either geographically or over a plurality of processors (that is, a distributed application (DA) comprising a plurality of Application Programs (DAPs)) must deal with technical problems which do not arise with non-distributed applications (NDA's). These problems include communications between the disparate parts of the application, and how to deal with failures or unsatisfactory performance of remote systems or remote parts of the application.

One known approach to addressing these problems is to use a Distributed Application Infrastructure (DAI) which provides services that mask the fact that communication is taking place within a distributed application making the DA appear to be a NDA to programmers and end users. This approach is used when Remote Procedure Call is used for communication. The use of such a DAI is intended to simplify application programming. However, in a NDA problems such as system failure affect the entire application (or none of it) so that the entire application is halted, whereas problems in one Application Program (DAP) within a DA can theoretically be masked from end users of the application by code within other DAP's which have not failed. The effectiveness of such masking depends on the role of the DAP which has problems. A significant technical problem here is that the pretence of non-distribution (when a DA is made to appear as an NDA) prevents this masking of problems from taking place. Furthermore, the inclusion of masking code within an application program adds considerable complexity to the mainline application program code, making the task of application programming more difficult.

The following are examples of situations in which masking of error conditions is desirable:

In an application involving a series of operations culminating in a final update of a database, the final update could be deferred without impacting the end user if a communications failure temporarily prevented the update request from reaching the database.

In a retail application, the normal credit check could be waived if the credit checking system was temporarily inaccessible, provided the price of the goods being sold was below a predetermined amount.

Required is a method and a system which enables efficient handling of error conditions and 'masking' of errors within a Distributed Application. Also required is a method and a system which facilitates masking of problems without requiring very complex application programs. More generally, although computer programs having support facilities for inter-program communication are known in the art, the function of such programs tends to be to transfer information rather than to additionally provide support for the processing of that information. Commercial messaging software such as IBM's MQSeries products (described below) is known to provide facilities enabling application programs to send and receive messages, but the processing of the messages is left for the application programs themselves. Thus, application programs generally must include the necessary instructions to enable processing of all incoming messages, including instructions for processing messages which raise error conditions or require non-standard processing for some other reason. For example, when a message arrives late it may be required to perform a different process than when a message arrives on time (e.g. notifying the sender that a late request will not be complied with).

(IBM and MQSeries are trade marks of International Business Machines Corporation).

There are many conditions other than late receipt which may necessitate certain messages being processed differently from other messages. For example, it may be desirable to delay processing of a message until a specified number of related messages have arrived; or different states of an application program instance may necessitate different actions.

Dealing with the special cases of error conditions, and other factors which make it desirable to process different messages in different ways, is a difficult aspect of application programming—adding both to the time required for the programming task and to the complexity of the final programming code.

There is thus a requirement for a method and a system which enables efficient handling of error conditions and other criteria which necessitate different processing of different types of message, while reducing the complexity of the application programming.

SUMMARY OF INVENTION

In a first aspect, the present invention provides a data processing system having facilities for supporting communications between application programs, including an application infrastructure (AI) for supporting processing of input messages received by said system, the AI including:

means for listing input message types;

means for listing application program components (APCS) of modular application programs (APS) supported by said AI, which components are separately selectable;

means for identifying the type of an input message and for selecting, in accordance with predefined associations between said listed input message types and application program components, one or more appropriate application program components to process said input message.

The "application infrastructure (AI)", so named because of its function of providing services in support of communicating application programs, is preferably implemented as a software product or an integral part of a software product. The AI has at least read access to the list of input message types and to the list of application program components (APCS) of modular application programs (APs).

There is thus provided a system having facilities for selection of particular code components or modules within an application program prior to the application program processing an incoming message, this selection or 'tailoring' of the application program being dependent on the 'type' of the message. Message 'type' in this context may refer to any predefined characteristics which are identifiable and usable as criteria for determining which application program components to select (e.g. the message 'type' may refer to whether the message is a request, a reply or an informational message, or whether the message is a delete instruction or an update instruction). The phrase 'message type' will be used hereafter to refer generally to any characteristics which are static for a particular message.

The predefined relationships between message type and specific application program components may be implemented in the system as table entries, so that selection of application program components entails scanning the table. The system may ensure that each received message for which there is a relevant table entry will cause those components to be automatically selected. Alternatively, the automatic selection may take place only when certain other criteria are met (see below). If there are received message types having no such predefined association then a default selection can be triggered.

The invention enables a simplification of application programming by providing an application infrastructure which efficiently selects appropriate components within an application program (preferably automatically invoking their methods as part of the selection step) to process an incoming message. That is, the application infrastructure performs services on behalf of applications such that the application programs themselves can be simpler and clearer. Application function can be encapsulated in easily reusable units for implementing, for example, navigation logic (for message routing), presentation logic and business logic.

Tabular selection of particular procedures or components within an application program depending on the type of an incoming message (and, optionally, also depending on other message or system characteristics) enables code for masking errors or failures to be added to an application program without impacting the main processing code. The masking code can be provided within a specialised code module which is only selected when error conditions are detected or in other specific circumstances.

Systems according to the invention are particularly advantageous for supporting message communications between application programs (DAPS) within a distributed application (DA), but are not limited to this.

It is preferred for the procedures which are defined by the modular application programs to be invoked only when certain rules are satisfied, and to achieve this the application infrastructure has means for comparing certain characteristics of an incoming message (and/or characteristics of the system at the time the message arrives) with rules for message processing.

Thus, the application infrastructure preferably supports rules for selecting appropriate application program components which include criteria other than message type. If message 'type' refers to characteristics which are static and inherently part of the message, then the other characteristics which may be examined to determine what operations to perform can be described as dynamic characteristics. These can include characteristics such as whether a message is late or on time, whether messages have arrived out of sequence, and what state the application is in. For example, a rule may trigger a component to be selected (i.e. invoking the procedure which is defined by that application program component) only when a preset time period has expired or only when the last one of an awaited set of reply messages is received. The support of processing control based on dynamic characteristics of a message or of the system is a significant novel aspect of the invention.

Thus, according to a preferred embodiment, the means for identifying and selecting supports the application of 'timeout' rules which take account of system and communication failures, such that the invention facilitates provision of a table driven approach to handling errors and failures in distributed applications. These 'timeout' rules define appropriate actions to be performed when messages are not received within a specified time period. For example, the application program could give a partial answer to an end user, or could use business risk. criteria and allow the user to proceed as though no failure had occurred. It is also preferred to support the inclusion of rules for defining what to do when a message arrives late but is still current (i.e. dealing with slow performance as well as out-of-date messages resulting from failures). The rules may be incorporated either within application programs or within the application support infrastructure itself.

A system according to a preferred embodiment of the present invention has means for assigning a first identifier to an outgoing message from said system, means for maintaining a list of identifiers of the outgoing messages from said system, and means for examining the identifiers of incoming messages and comparing with said maintained list to identify incoming messages which are associated with said listed outgoing messages. For this comparison to be meaningful, it is required for the receiving system to which the outgoing message was directed to have means for attaching a second identifier to the messages which it sends in response to said outgoing messages, the second identifier being associated with the first identifier of said outgoing messages.

It is generally preferred for each system involved in the message communication to include the means for assigning a first identifier to its respective outgoing messages, the means for maintaining and examining the list, and the means for assigning to a response message a second identifier which is associated with the identifier of the initial outgoing message. An identifier is one of the static characteristics of a message.

The first identifier and the second identifier (e.g. for a request and its associated reply respectively) preferably comprise a single common value within a field of the respective message such that a value assigned to a request is reflected back in the reply and can be easily compared with request values held in a table. The first identifier can thus simply be wrapped back to the sender of a request in replies without interpretation of the identifier by the receiver. A system according to the invention preferably maintains a list of the identifiers of received reply messages, each entry in the list indicating that the listed reply message is available for processing.

The use of first and second (reflected) identifiers facilitates easy recognition and association of related messages. A system according to this preferred embodiment of the invention enables an application program to make multiple requests in parallel, using the identifiers to distinguish between the messages associated with its different requests, thereby delivering better processing performance than systems which only support requests made serially.

According to another aspect of the invention, responsiveness to reply messages arriving out of sequence is facilitated by the use of 'wave numbers' recorded in a 'wave table'. Wave numbers are reference numbers similar to sequence numbers for messages sent from a system, but the manner of use of wave numbers according to the present invention is a significant point of novelty over prior art systems in which a receiver uses sequence numbers to check reliability of data transmission. Such prior art systems require sequence numbers to be sequential to the specific receiver, so that holes in the sequence are meaningful to the receiver. Wave numbers as used in accordance with this aspect of the present invention are not necessarily sequential to any given destination (although they are monotonically changing numbers), and so the prior art use of sequence numbers is not applicable. wave numbers are assigned to messages by the sender of the messages (e.g. are entered in a field of the message or message header) and are wrapped back to the sender in reply messages but are otherwise unused by the receiver application program.

According to this aspect of the invention, there is provided a data processing system having facilities for supporting message communications between application programs and having an application support infrastructure including:

means for assigning a reference number ('wave number') to a request message sent from a first supported application program, and means for recording said reference number as an expected-reply-message reference number;

means for recording and updating the highest reference number of received-reply-messages;

means for updating the recorded expected-reply-message reference number with a new assigned reference number each time a watershed is reached within said first supported application program; and means for examining reply messages received by said application support infrastructure in response to said request messages, which reply messages include the reference number of the associated request, and determining whether the reference number of a received reply matches the expected-reply-message reference number or the highest received-reply-message reference number.

This aspect of the invention requires that the application program which received the request is supported by an application support infrastructure having means for retrieving the reference number of a request message and assigning said reference number to an associated reply message.

The conditions which result in a watersheds within the application will be determined by the application programs themselves; they may be any cut-off point within an application at which it is appropriate to delimit some aspect of the application. That is, a watershed may be the expiry of a set time period if it is desirable to process messages received before the watershed differently from messages received after the watershed. The invention provides the means for determining whether a reply message is received before or after the application program watershed. Watersheds may be initiated by many different conditions, including timeouts, or any application initiated action. For example, if a first application program receives a request from another application program and subsequently replies to it, then the sending of the reply may result in a watershed within the first application program. Alternatively, the receipt of the last one of an awaited set of messages may satisfy the conditions for a watershed.

The use of these reference numbers or 'wave numbers' and a 'wave table' (in which are recorded the expected-reply-message wave number and the highest received-reply-message reference number) thus allows the application infrastructure to support an application sending multiple concurrent messages within a particular task and to deal with the possibility of reply messages arriving out of sequence (if expected and received wave numbers do not match). It also facilitates identification of duplicate messages (i.e. if the wave number of a received reply matches the stored highest received reply wave number). This will be described in more detail later.

The identification of duplicates gives a user who is waiting for a response to a message the flexibility to retry sending the message, leaving the system to ensure that there is no confusion between the first message and the retry. The end user can thus retry sending a request when he suspects that a request message has been lost or is delayed, without risking repeated processing if replies to both the requests are eventually received.

In a third aspect, the present invention provides a method of supporting the processing of messages sent between application programs, the method including the steps of:

examining incoming messages to determine the type of message;

selecting particular application program components of a modular application program to process the message, the selection being in accordance with predefined associations between input message types and application program components.

Selection of appropriate application program components preferably includes the application of rules defining the operations to be performed for different types and characteristics of the incoming messages. The supported rules preferably take account of dynamic criteria such as whether a timer has expired before the message arrives, what the state of the application is at the time of receipt, or whether all of a set of expected replies have been received.

A method according to a preferred embodiment of the invention supports processing of messages sent between application programs (DAPS) within a ditributed application.

A fourth aspect of the invention provides a program product recorded on a data carrier, for supporting communications between application programs, including an application infrastructure (AI) for supporting processing of input messages received by a system on which said program product is installed, the AI including:

means for listing input message types;

means for listing application program components of modular application programs supported by said AI, which components are separately selectable;

means for identifying the type of an input message and for selecting, in accordance with predefined relationships between input message types and application program components, one or more appropriate application program components to process said input message.

DESCRIPTION OF EMBODIMENTS

The present invention will now be described in more detail, by way of example, with reference to the accompanying drawings in which.

To aid understanding of specific embodiments of the invention, message queuing communication will firstly be described. Message queuing is a known method of program-to-program communication which is well suited to a distributed environment and which allows applications to send and receive application-specific data without having a direct connection established between them. Message queuing will be described to help illustrate a particular implementation of the present invention, although the invention's applicability is not limited to message queuing systems.

The message queuing method of program-to-program communication supports asynchronous, connectionless communication. Connectionless communication is achieved by a first application program (X) giving messages to a message queuing service, and a second application program (Y) getting messages from the message queuing service. The message queuing service acts as an intermediary, and the mechanism by which the message is transmitted from X's message queuing service to Y's message queuing service can be completely hidden from the application programs X and Y.

A queue manager is the system service that provides the message queuing facilities used by applications, and can be implemented as a communication manager program product. Applications obtain message queuing services by using application programming interface (API) calls to communicate with the local queue manager (that is, the queue manager that is installed on the same system as the application).

A message queue is a named object in which messages accumulate, and from which they are removed in a time-independent manner (i.e. when a receiving application is ready rather than at a time determined by the sender). The queue belongs to and is maintained by one particular queue manager. The physical representation of a message queue depends on the environment, but can be a buffer or buffers in main storage, a file or files on disk or other permanent storage, or both. However, the physical management of message queues is the responsibility of the queue manager, and such details are not made apparent to the application program.

Figure 1:
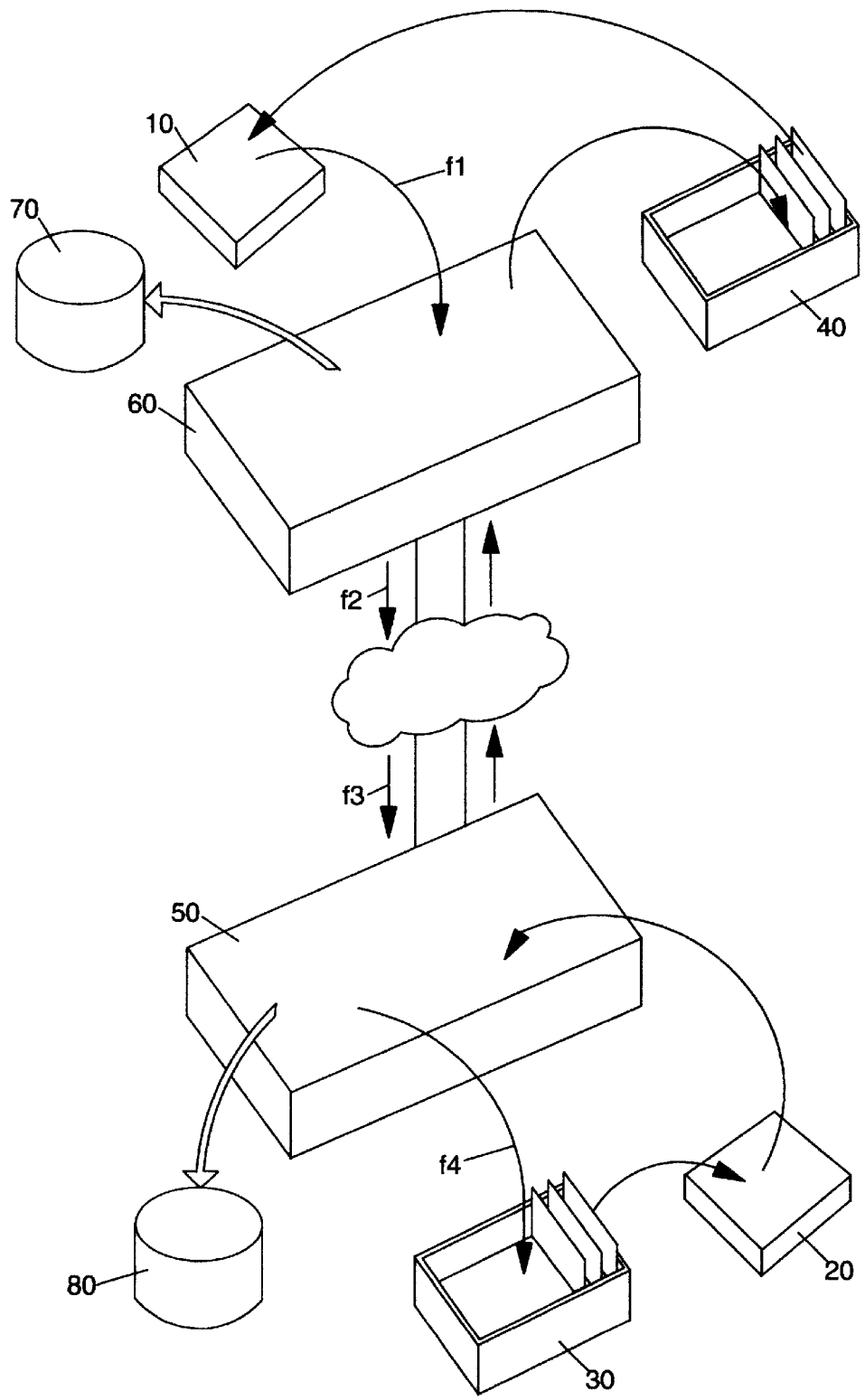
FIG. 1 is a schematic representation of bidirectional message queuing communication between application programs.

Applications communicate by agreeing to use particular named message queues. For example, as represented schematically in FIG. 1, when program 10 wants to send information to program 20, program 10 sends a message to queue 30, because this is the queue that program 20 has agreed to read from. The message flow between application 10 and queue 30 is represented in FIG. 1 by arrows f1, f2, f3 and f4. If program 20 wishes to reply, it sends messages to queue 40, because that is the queue that program 10 has agreed to read from. The location of these queues is not apparent to the applications which send the messages; each application (10,20) interacts only with its local queue manager (60,50), and it is the network of interconnected queue managers that is responsible for moving messages to the intended queues such that the application programs are shielded from network variations and complexities. Any changes made to recoverable resources by the transfer of messages and subsequent processing are recorded in recovery logs 70,80 for use in the event of a subsequent failure. Such application support is provided by IBM's MQSeries commercial messaging software products.

IBM's MQSeries products are described in more detail in the following publications which are available from IBM: "MQSeries Message Queue Interface Technical Reference" (IBM document number SC33-0850-01) and "IBM Messaging and Queuing Series—An introduction to Messaging and Queuing" (IBM document number GC33-0850-00). These documents are incorporated herein by reference.

As well as one-to-one communication such as is shown in FIG. 1, the communication can be one-to-many (such as where three instances of a single application are running concurrently and may be taking messages from the same queue), or many-to-one (such as if there are multiple clients sending messages to a single server), or a combination of all of these relationships.

Figure 2:
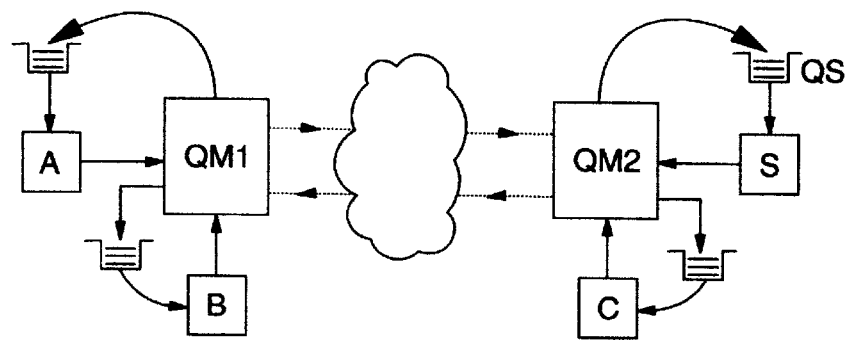
FIG. 2 is a schematic representation of message queuing communication within a client-server application.

Message queueing is very well suited for client-server applications, where many client programs send messages to a single server program. FIG. 2 shows the case of three clients A,B,C sending messages to a server S. The server replies to three different queues, depending on the originator of the request. In the example of the Figure, clients A,B are remote from the server and client C is local to the server. While FIG. 2 shows several client programs putting messages on a single queue (QS), it has already been noted that it is also possible for several server programs to get messages from a single queue. This is useful where the volume of message traffic exceeds the processing capacity of one server application program instance. It should also be noted that a request from a client may be separated into multiple requests, which are then processed in parallel by different servers. While queue managers provide considerable application communication support (maintaining message queues and the relationships between messages and queues, handling network failures and restarts, and moving messages around the network) the programming task of developing large, integrated and extensible client-server applications remains a difficult one. To solve problems associated with this task, a further system component (actually a set of components, implemented in computer software) is provided by the present invention—an application support infrastructure providing support for design, development and run-time execution of client-server applications.

Figure 3:
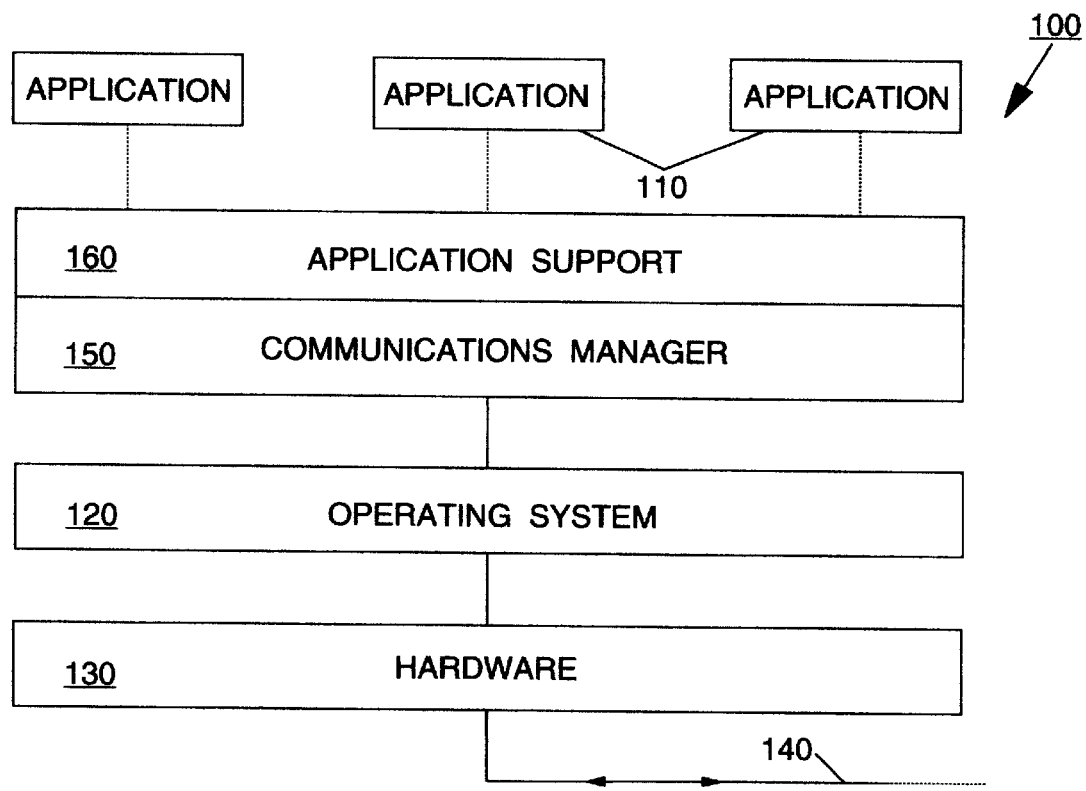
FIG. 3 is a schematic representation of a computer system in which the present invention may be implemented.

FIG. 3 is a simplified schematic representation of a computer system showing the layered structure of the major system components, including an application support infrastructure in which the present invention is implemented. A typical distributed data processing network comprises a plurality of disparate computer systems 100, which may range from laptop or desktop systems to mainframe systems, each of which has particular application programs 110 running on the system. These applications are adapted to the particular operating system 120 of the system on which they run. Also provided in a system according to this embodiment of the invention, to support the exchange information between application programs across the network links 140, is an application-enabling communications manager 150. The communications manager interfaces with the operating system and provides services for the applications, shielding the application programs from the complexities of the network and managing the work of providing secure inter-program communications.

Linked to the communications manager, and adapted to make use of the communications manager and operating system facilities, is an application support infrastructure 160 which provides support for designing, developing and running distributed client-server applications. An embodiment of the application support infrastructure and an example of the structure of client-server applications which it can support will be described hereafter.

Structure of Supported Applications

The application support infrastucture enables the use of structured application code where function is encapsulated in easily reusable units. An application specifically adapted to make full use of the facilities of the application support infrastructure (referred to hereafter as a 'supported application') will typically provide services to an end user using a workstation (e.g. running IBM's OS/2 operating system), but different parts of the overall application will run on the user's workstation, on a LAN application server, and on a host system (such as an IBM ES/9000 mainframe). The logic of the application is held together by rules, as will be described below (i.e. according to this example of the invention, rules are a major part of the applications rather than being defined as part of the infrastructure—the infrastructure provides the function for applying the rules).

Use of the phrase 'supported applications' does not imply that other applications are not supported by systems implementing the present invention—the phrase is intended to describe a flexible, distributed, client-server application structure which is made possible by an application support infrastructure according to the invention and which makes full use of the infrastructure.

(OS/2 and ES/9000 are trademarks of International Business Machines corporation).

A supported application is structured at the highest level as a set of 'classes' associated by rules. The classes can be of three types:

1. Graphical User Interface (GUI) classes. These run on a user's workstation. They present windows through which the user interacts with the application and they interact with the rest of the application by sending and receiving messages.

A typical application will include many GUI classes. One or more GUI classes will typically be packaged together into a single executable GUI program.

2. Business Logic (BL) classes. These run on a LAN application server.

They collect and store work-in-progress data related to the application, perform computations on the data and send the data to other classes. BL classes interact with the rest of the application by sending and receiving messages.

A typical application will contain many BL classes, typically packaged independently of each other as a single Dynamic Link Library (DLL).

3. 'Host' classes. These run on a back-end system such as IBM's CICS or IMS transaction processing systems, or any system for which there is an IBM MQSeries queue manager product. Host classes provide a means for reading and writing to host databases under transactional control, and typically would be responsible for preserving integrity and auditability of the data they update.

Host classes do not run under the control of the application support interface, but use the Message Queuing Interface (MQI) of the relevant MQSeries queue manager product, and follow standard MQI guidelines for receiving and replying to requests. The MQI is an application programming interface (API) which is described in the aforementioned IBM document number SC33-0850-01.

(CICS and IMS are trademarks of International Business Machines Corporation).

These different types of classes reflect different generic roles within the application. For example: a GUI class supports user interaction; a host class provides access to host data, and a business logic class provides a caching function so that data retrieved once by a GUI from a host can be retrieved more quickly from the LAN on subsequent accesses. All GUIs and BL classes can be clients and servers to other classes (i.e. the relationships between classes are "peer-to-peer").

Figure 4:
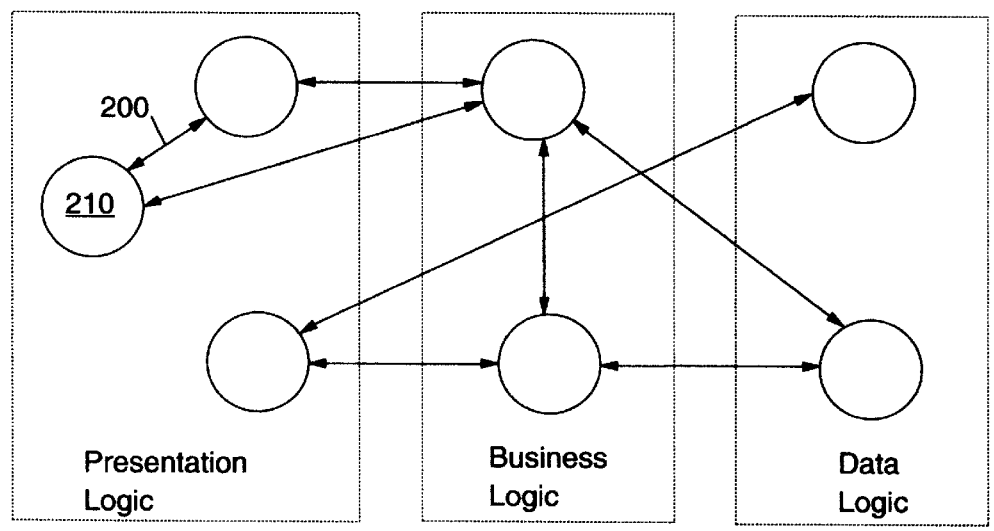
FIG. 4 represents the three-tiers of an application which is supported in accordance with an embodiment of the invention.
Figure 4:
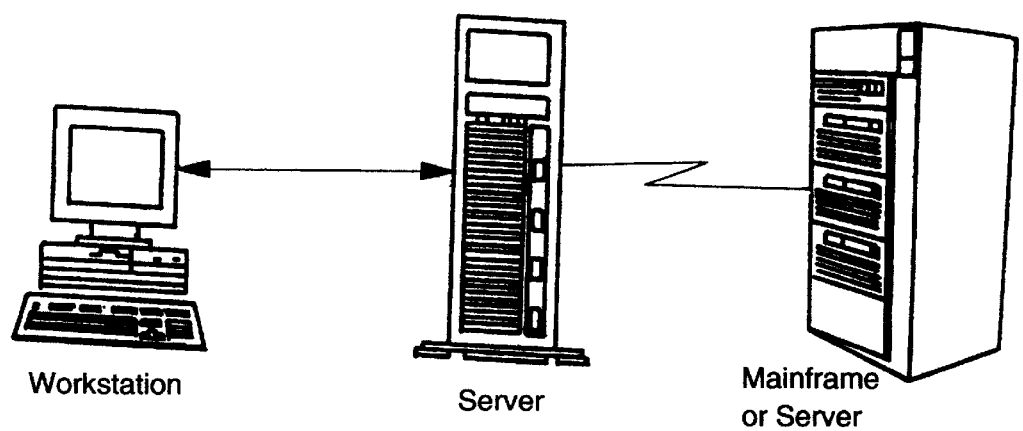

FIG. 4 is a representation of the relationships between the three tiers of this distributed model of client-server computing. Arrows show the possible message flows 200 between the classes 210 which make up a distributed application.

Within a supported application, there are rules which define and restrict which classes can send which messages to which other classes, and thereby enable compile-time and run-time checking to assist application development, testing, deployment and support. Rules define how all the asynchronous situations associated with client-server messaging applications are handled (such as timeouts, the need to wait for multiple replies, and the handling of errors such as an invalid message). The defining of rules and their subsequent use will be described in more detail below.

At the next level of granularity down, an application class is structured as a set of 'procedures' (each implemented as a modular application program component). Each procedure deals with a single situation, such as the arrival of a request from another class acting in a client role or arrival of a reply from a class acting in a server role. A procedure will terminate after execution (e.g. having made a request it will not wait for the reply—the class will include another procedure written to handle the reply).

The application support infrastructure thus uses rules to determine which procedure it invokes, and under what circumstances. Each rule is defined in a RULE section of a class source file, which RULE section specifies the name of the procedure that is invoked when the rule is satisfied. This is simply the name by which the procedure is defined in a PROCEDURE section of the class source file, so the rule definition does not need to specify the actual name of the program that the rule invokes.

The RULE section also specifies the conditions that are required to satisfy the rule. Conditions can be based on:

the arrival of one or more messages
the expiry of a timer
the state that the instance is in At least one message type or a timer is specified in each rule, and the instance state is an optional additional condition (i.e. the state that the instance must be in, or must not be in, to satisfy the rule).

The conditions that can be specified in a rule can be varied and complex because there are three basic types of message (inform, request and reply), four criteria which can be specified (required, conditional, late, and placeholder), and a timer can be added to the rule. To any of these rules can be added conditions regarding the instance state.

Infrastructure Components

Figure 5:
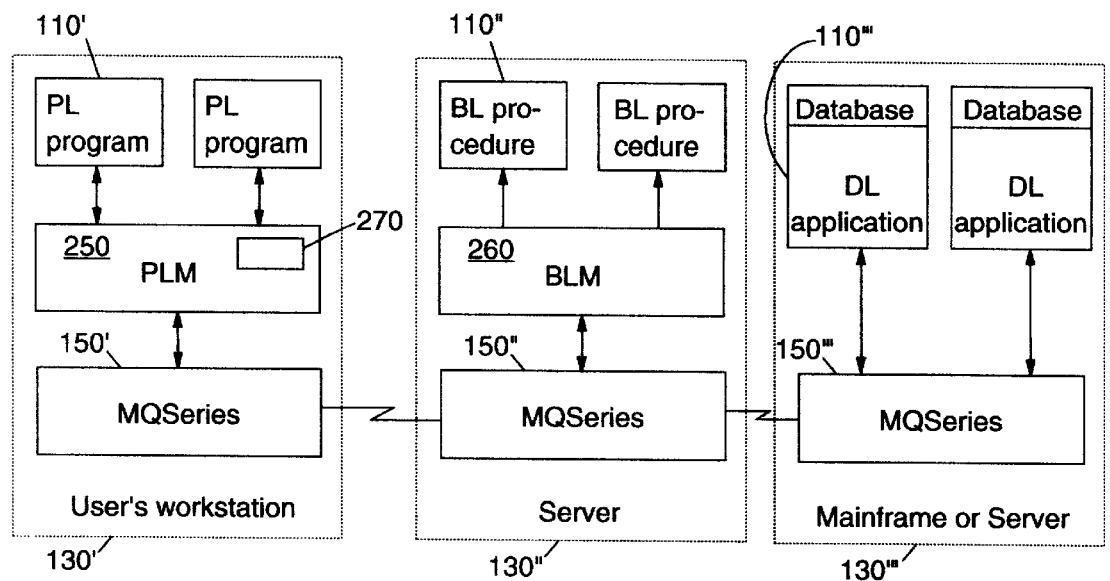
FIG. 5 shows the main infrastructure components which are used when a supported application runs, and their location within a client-server environment.
Figure 6:
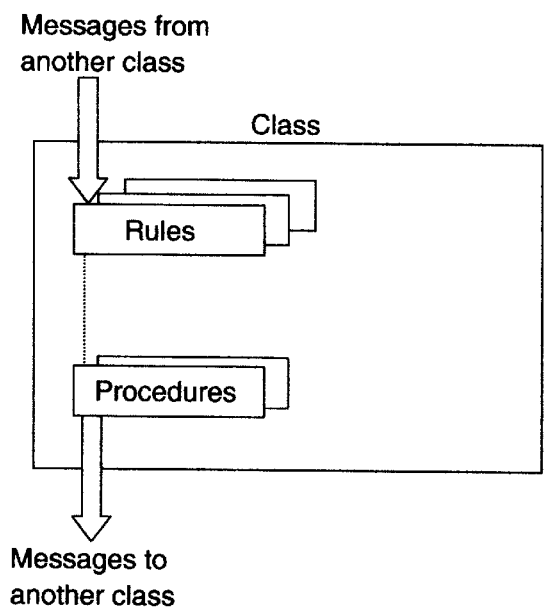
FIG. 6 represents the relationships between classes, rules and procedures of a supported application, and the messages which are exchanged.

It will be useful here to identify the key components of the infrastructure. FIG. 5 shows the parts of the infrastructure which are used when a supported application runs. The main components are as follows:

Presentation Logic Manager. This component (250) runs on the user's workstation and provides the environment and APIs used by the GUI procedures.

Business Logic Manager. This component (260) runs on the LAN application server systems and provides the environment and APIs used by the business logic procedures.

Rules Compiler. This component is used during application development. It reads an ASCII source file written in an infrastructure-specific language (known as Rules Definition Language) and outputs a binary file which is used at run time by the Business Logic Manager and Presentation Logic Manager, to determine which procedure to invoke when a particular message arrives.

Job Viewer. This component (270) runs on the user's workstation and provides a container window that lists the windows associated with a job and allows navigation between them. A job is an instance of execution of a supported application, the boundaries of which may be determined by the user. The word 'instance' in this context is intended to refer to an instance of execution of a particular class of a supported application. The Job Viewer assists a user running multiple jobs, avoiding confusion between the windows of one job and those of another.

Particular infrastructure implementations may include additional components related to application testing and debugging, but it is not necessary for these to be described herein.

Operations of Distributed Application Support Infrastructure

The distributed application support infrastructure uses a table driven approach for selection of appropriate application program components to process an incoming message. The table associates particular message types and other static characteristics of a message with appropriate code modules to process the messages. The tables are created as the first action which an application program takes on start-up.

Separate from this is the 'wave table', which records specific reference numbers ('wave numbers') associated with outgoing messages sent from an application program. Wave numbers monotonically changing numbers which are used to identify certain messages to enable alternative processing, discriminating between messages which are on time (and to be processed normally), late (but still current and still to be processed), and out of sequence. The distributed application support infrastructure builds the wave table, providing a slot for all reply messages. The wave table contains a field for entering the highest wave number of a received message (which is initialised to 0) and a field for entering a global current wave number, which is initialised to 1.

When an application program running under control of the application support infrastructure sends one or more request messages, thereby causing the expectation of matching replies, the distributed application infrastructure copies the global current wave number into a field of the outgoing messages and into a table slot for the outgoing messages.

The application program receiving the request must also be a supported application (or at least must be able to wrap back the wave number in its reply). Each distributed application infrastructure under which a supported application runs has means for automatically retrieving the wave number of a received message and attaching that wave number to messages which are sent in reply (i.e. reading from a field of an incoming message and writing to a field of an outgoing message).

When a reply message arrives, the application support infrastructure which receives it compares the wave number in the reply message with the stored global current wave number. This stored wave number is the expected wave number of the reply message, since the most common processing conditions result in the reply to a request being received before the global current wave number is changed. The global current wave number is changed when a watershed is achieved within the application program. A watershed is an application-defined change within the application program's execution, and may be either the occurrence of a timeout or an explicit application action. One such application action is the sending of a reply message from the current application to another application which invoked the local application, thereby completing a procedure within the local aplication program. Another such application action is the invocation of a new application program component when a rule is satisfied.

If the received reply message wave number matches the global current wave number (i.e. the expected reply wave number) then the message is deemed to be on-time. If they do not match, then the message is deemed to not be on-time. In the latter circumstance, the application support infrastructure compares the wave number in the reply message with the highest received wave number field in the table. If the received reply message wave number is greater than the 'expected wave number' then the message is deemed LATE (see below). If the received message wave number is less than the message is deemed OUT OF DATE (meaning that the reply message has arrived after the application program procedure which sent the request has passed a watershed). If the received reply message wave number equals the stored expected wave number, then the received reply must be a duplicate.

Both of the cases of a duplicate message and an OUT OF DATE message trigger generation of an error message, and the reply message i's discarded.

A LATE reply message is one which has arrived at a time such that requests and corresponding replies have not occurred in a serial sequence. In most cases, the receiving application will still wish to process the reply messages as they have been received before a watershed (i.e. they are not OUT OF TIME, they are merely not in serial sequence). For example, the time sequence of operations may be as follows:
1. Request1 sent;
2. Request2 sent;
3. Reply1 received;
4. Reply2 received.

Using the terminology above, Reply1 is LATE as it is subsequent to Request2 being sent but is still a current message which the application is likely to wish to process. The application support infrastructure thus allows a distinction to be made between reply messages which are LATE (non-serially sequenced) but still valid and messages which are duplicates or are invalid because they are OUT OF TIME. This is achieved simply and reliably using a number entry in a message field and comparing with recorded numbers in a wave table. The infrastructure thus enables a plurality of concurrent requests to be sent and their replies to be processed correctly and without confusion between them.

The operations of the application support infrastructure on receipt of an incoming message are as follows. Incoming messages to an application program (DAP) within a distributed application are examined by the distributed application infrastructure (DAI), fields within the messages being compared with constant values in the table. Either the type of this message is located in a table listing message types or, if there is no relevant table entry, an error is raised. The message may be a request, a reply or an informational message (these being message 'types' which are defined by the application infrastructure) and it may be either an instruction to add, update or delete (these being aspects of message type which are defined by the application). Secondly, the message's identifier value is compared with listed identifiers for tasks in which the system has already been involved (i.e. a list of identifiers of requests which originated at that system). If the received message is a new request, then there will be no matching identifier in the table; if the message is a reply to a request from the current system, which request is not out of time, then there will be a match in the table. Thirdly, the wave table is examined to check whether the message raises error conditions (e.g. is out of time, out of sequence, or is a repeat). Fourthly, these and other characteristics of the message (and possibly also other characteristics of the system or the application) are examined and compared with rules which dictate which application program components should be called.

If the message is a request, it is passed to an appropriate application program component as specified in a relevant rule. If the message is a reply it is added to a list of replies associated with a particular rule which are available for processing by the application program. The rules for processing are scanned to determine whether one is now satisfied and if so the appropriate application program component is called. For example, one such rule may require all of a set of reply messages to have been received before a procedure is called to process the replies, and so scanning the list of received reply identifiers serves to determine whether all the replies are now available. If not all reply messages arrive back within a predefined timeout period a procedure which is named in a 'timeout rule' is invoked.

The support for rules including timer controls and other dynamic controls will now be described in more detail. As noted above, the infrastructure's APIs and the related services use messaging to communicate between instances. The infrastructure, as well as managing application instances, also uses the MQSeries message queuing interface (MQI) calls to implement the communication, so that supported applications do not use the MQI directly but use the infrastructure APIS.

The application support infrastructure's Presentation Logic Manager supports an API call MQTIME, which can be used to start a timer within the scope of a rule. The name of the particular timed rule (defined in the Rule section of a class source file) is a parameter of the MQTIME call, as is the period of time after which the timer on the named rule expires.

For each timed rule in a procedure, there is a corresponding timer. Each timer has four actions that can be invoked under PLM control: start the timer with default timeout period (e.g. 1 second); start timer with value (i.e. timeout period set by a parameter passed in the API call); start timer to expire immediately; and start timer with timeout period set to unlimited (i.e. never expires). The latter option is primarily used when testing applications which include a timed rule.

When a timer expires and a rule is satisfied, some or all of the messages associated with a rule may be absent.

Satisfying a Rule

For a message to match a message definition in a class source file and satisfy a rule, the following conditions must be met:

The destination class of the message must be a class supported by the Presentation Logic Manager or Business Logic Manager.

The following properties of the message must match the definition of the message specified in the rule:

the message type the operation code the operation version the role (for reply messages only)

The message must be the same format as that specified in the rule.

If the message is of fixed format, the length of the message data must be the same as that of the message specified in the rule.

An example of the sequence of processing when a rule is satisfied is represented in FIG. 5, which also shows the relationships between classes, messages, rules and procedures. The sequence of processing in this example is as follows:

1. An instance of one class sends a message to an instance of another class.
2. A rule is satisfied when a predetermined set of messages arrive.
3. When satisfied, the rule invokes a procedure.
4. That procedure performs some work for the class; this may involve sending further messages to other classes.

Allowed Types of Rule

The conditions that can be specified in a rule can be complex. Examples of the types of rules that can be used and the messages they can specify will now be given.

Placeholder messages: A placeholder criterion is available to reserve a place in the rule for a message that will not arrive. This is used in rules where it is desirable for a late reply to invoke the same procedure as a rule for more than one required reply. Placeholders may also be used when a programmer wishes to reserve a place for a message that will be added to the application in future but which is not relevant to the application in its present form.

The following are examples of allowed types of rule:

1. Rule for single inform message: This rule will be satisfied when the single named inform message arrives.

Figure 7A:
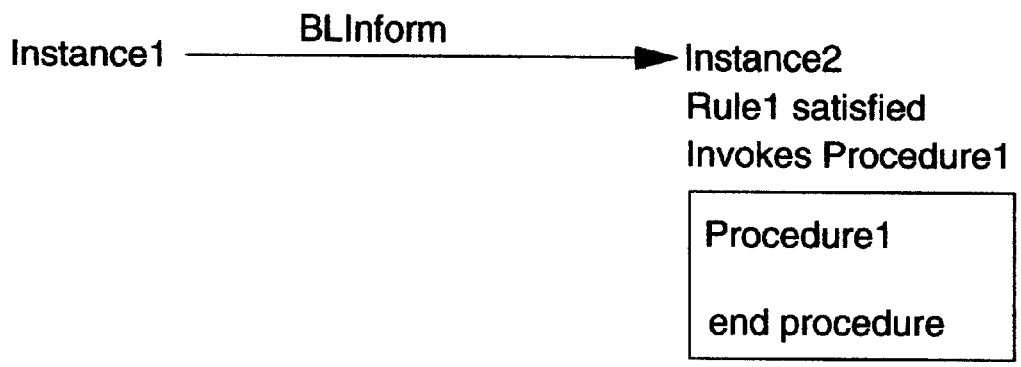
FIGS. 7A–7E show the sequence of operations of a method according to the invention for various allowed types of rule.

Example A: AS shown in FIG. 7A, Instance1 sends a single inform message to Instance2. The arrival of this message satisfies Rule1 and Procedure1 is invoked.

When the application support infrastructure invokes Procedure1, it passes the procedure an identifier for the BLInform message to show that the message has arrived.

2. Rule for a single request message: A rule of this type will be satisfied when a single named request message arrives.

Figure 7B:
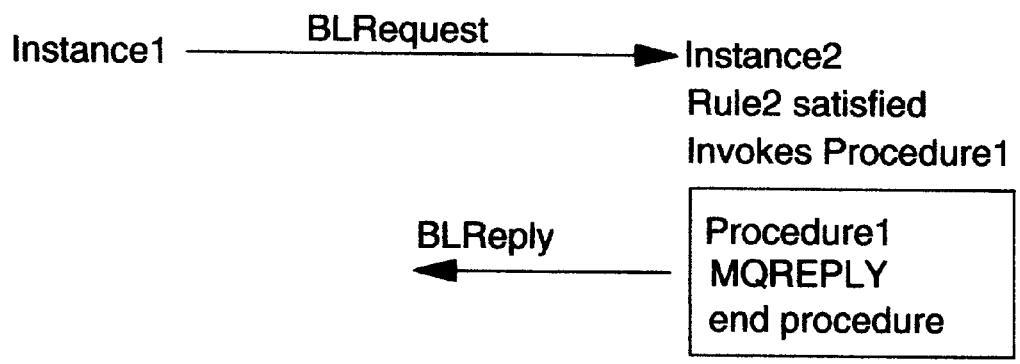

Example B: As shown in FIG. 7B, Instance1 sends a single request message to Instance2. The arrival of this message satisfies Rule2.

A message identifier for BLRequest is passed to Procedure1 when the procedure is invoked, to show that the message has arrived.

3. Rule for a single late reply message: when the procedure that processes a request message has to send its own request to get information from another class, it is possible for the reply to arrive later than when it is required. This is considered to be a 'late reply message' if it arrives too late to be used by the reply to the original request. In example C below, the message named Reply2 is late because it arrives after the message named Reply is sent.

If an application is to process any late reply message, then a rule of this type 3 must be used. If an instance does not have a rule to process a late reply message, then that message is discarded. A rule of this type 3 is satisfied when the single named late reply message arrives. Only one late message is permitted in each rule; any other messages in the rule must be placeholders.

Figure 7C:
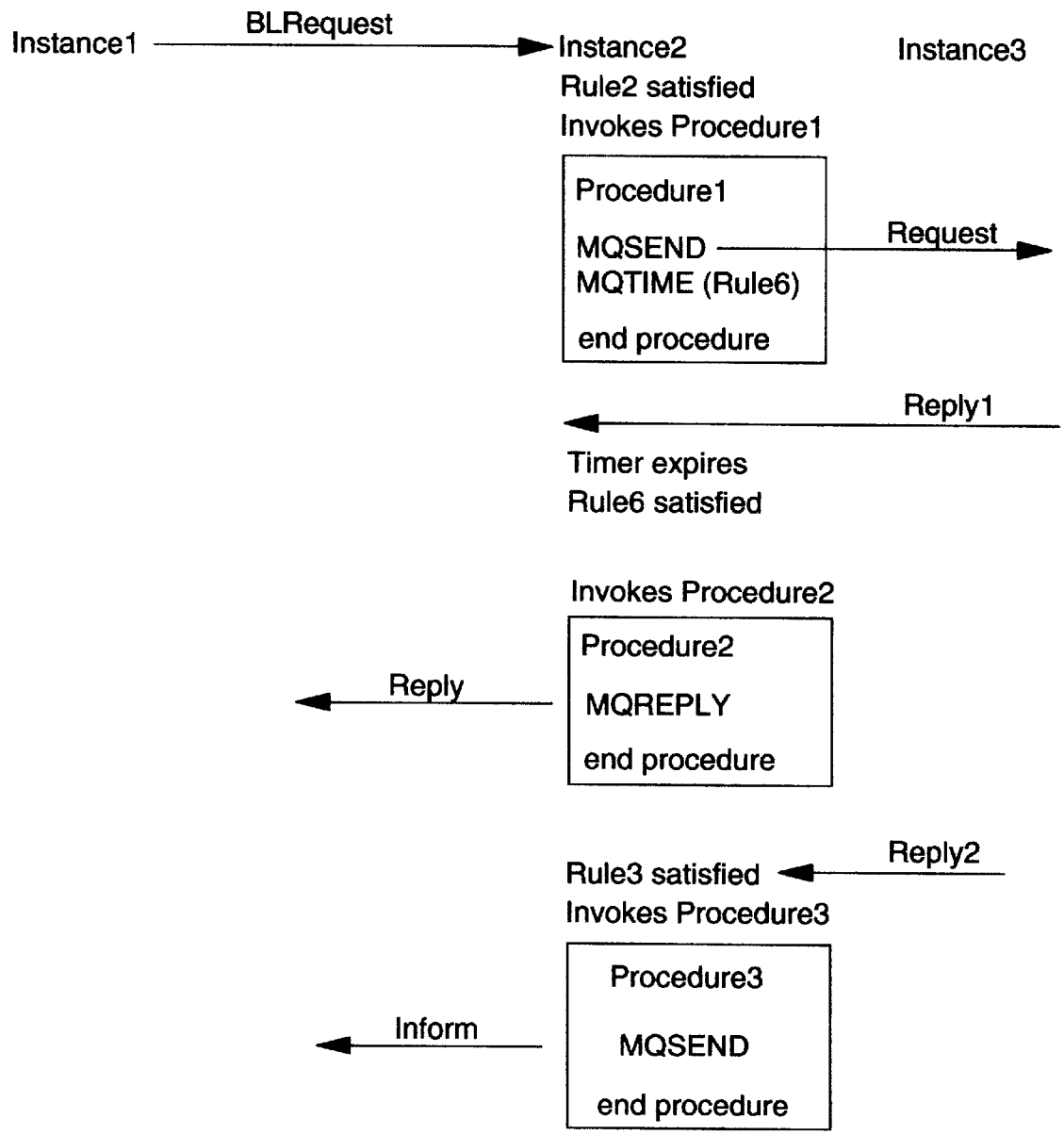

Example C: As shown in FIG. 7C, a procedure (Procedure1) sends two requests and sets a timer. Rule6 is satisfied when the timer expires (invoking Procedure2), even though only one reply has arrived. A rule of type 3 is needed to process the late reply. When Procedure3 is invoked, a message data flag for the Reply2 message is passed to the procedure to show that the message has arrived.

Figure 7D:
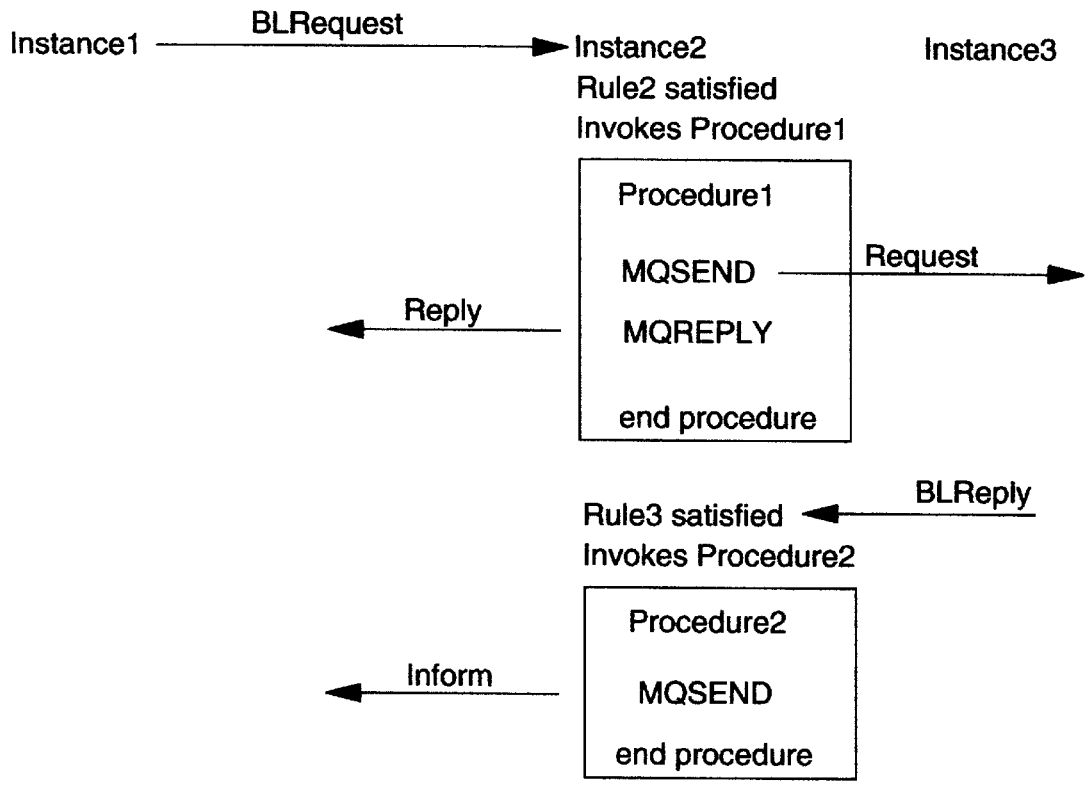

Example D: As shown in FIG. 7D, an instance (Instance2) uses a reply message to acknowledge that it has started work. The first procedure (Procedure1) sends the acknowledgement straight after it issues its own request. The reply from Instance3 to Instance2 is considered to be late. Instance2 uses a rule of type 3 to process the reply to its request. It then uses an inform message to send to Instance1 the data contained in the late reply. If Instance2 does not have a rule to catch a late message, this reply is discarded. When Procedure2 is invoked, a message data flag for the BLReply message is passed to the procedure to show that the message has arrived.

4. Rule for a timer only: A rule of this type is satisfied when the timer expires.

Figure 7E:
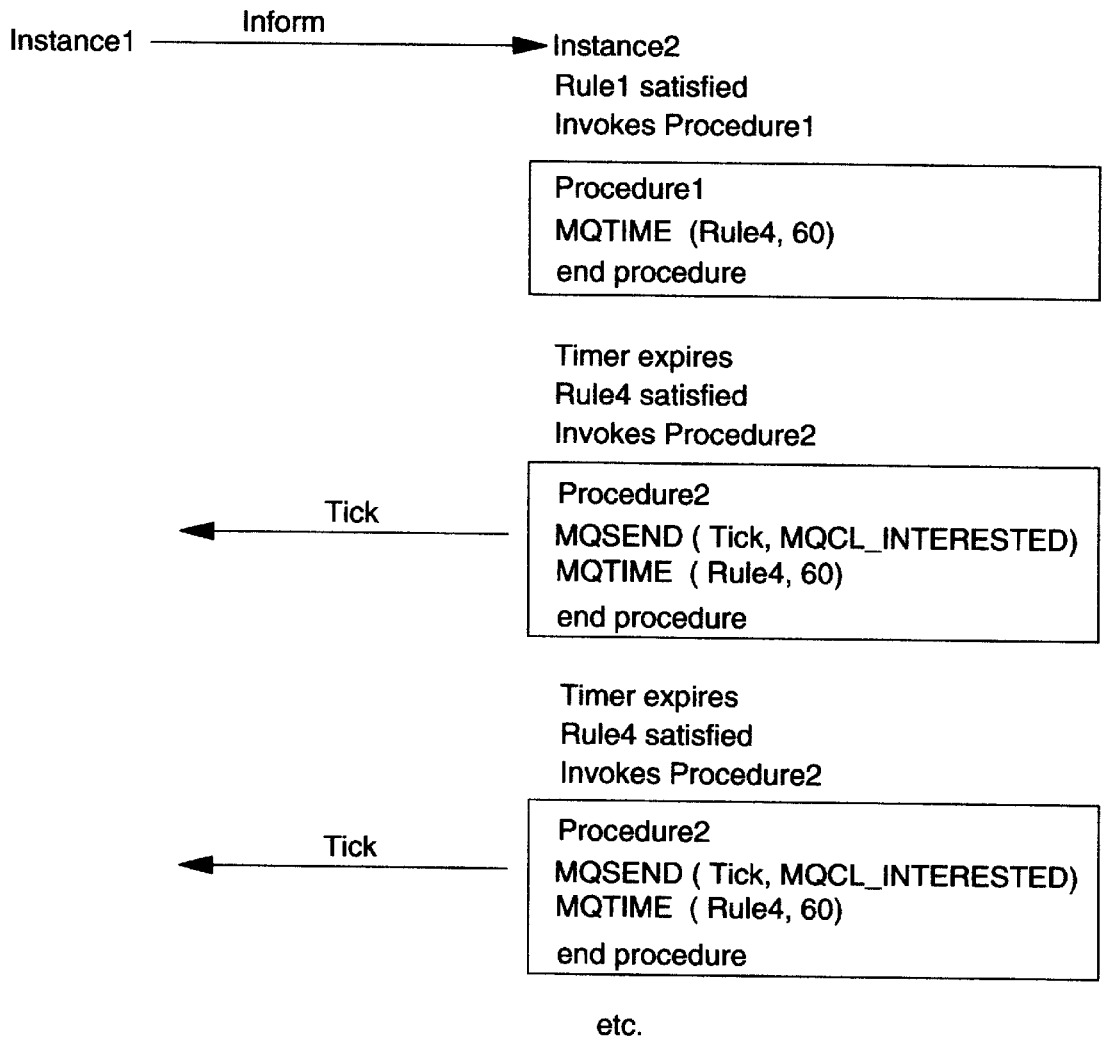

Example E: FIG. 7E shows an example of a timer program that sends messages every 60 seconds. Instance1 starts Procedure1 by sending it an Inform message. Instance1 registers interest in Instance2 when it sends this message. Procedure1 uses an API call MQTIME to generate a timeout event, starting a timer of 60 seconds duration; on this call it specifies the name of the rule that the timer will satisfy.

When the timer expires, this satisfies Rule4, invoking Procedure2. Procedure2 sends a message (named Tick in FIG. E) to all interested instances in the job every 60 seconds.

When it invokes Procedure2, the application support infrastructure does not pass the procedure a message data flag because there is no message associated with the rule.

Rule for Required Reply Message: A rule of this type is satisfied only when all the replies have arrived. Such a rule can be used for one request which requires one message, or it can be used for multiple requests and associated replies.

Rule for Conditional Reply Messages and a Timer: A rule of this type is satisfied when the timer expires, even if no replies have arrived. If a reply is received subsequently to the rule being satisfied due to timer expiry, then it is treated as late and a different procedure may be invoked to process it than if the message had arrived on time.

It will be understood that the above described rules are examples only and that many forms of rule can be supported by an application support infrastructure implementing the present invention.

It will be understood by persons skilled in the art that it is not necessary for the construction of the tables used for relating incoming messages to application program components to be the first action of an application program on start-up. The construction may be performed by a compiler using a textual definition to create a run-time table. It is also possible for new table entries (e.g. new message identifiers) to be added dynamically after the initial table creation.

What is claimed is:

1. A data processing system having facilities for supporting communications between application programs, including means for supporting processing of input messages received by said system, said means for supporting processing having at least read access to a list of input message types and to a list of application program components (APCS) of modular application programs (APs), which components are separately selectable, the means for supporting said processing including means for identifying the type of an input message and for selecting, in accordance with predefined associations between said listed input message types and application program components, one or more application program components to process said input message, wherein said means for identifying and selecting supports the selection of application program components in dependence on rules for message processing which rules relate message types and dynamic characteristics associated with a message to specific application program components.

2. A data processing system according to claim 1, wherein said means for supporting processing includes an application programming interface (API) supporting API calls for use in defining said rules, said supported API calls including a call for setting a timer and defining a timeout period.

3. A system according to claim 1, including a first node and a second node interconnected by a data link, said first node having means for assigning a first identifier to an outgoing message from said first node, means for maintaining a list of identifiers of the outgoing messages from said first node, and means for examining the identifiers of incoming messages and comparing with said list to identify incoming messages which are associated with said listed outgoing messages; and said second node having means for attaching a second identifier to a reply message sent from said second node in response to a received message from said first node, said second identifier being associated with said first identifier.

4. A system according to claim 3, including means associated with said first node for storing a list of identifiers for received incoming messages for which there is a corresponding identifier in said list of outgoing message identifiers, thereby to identify the availability of reply messages for processing.

5. A data processing system according to claim 1, which supports the processing of messages sent between first and second application programs which messages have a message type field, a message identifier field, and a wave number field, said means for supporting processing having at least read access to a list of recognisable message types, having read and write access to a list of recognisable message identifiers, and having read and write access to a list of wave numbers, said means for identifying and selecting including:

means for examining said fields of an incoming message;

means for comparing said type field with said listed message types and comparing said identifier field with said listed message identifiers to determine whether the message is recognised by the system;

means for comparing said wave number field with listed wave numbers to determine whether the message is on-time and in sequence; and means for comparing said message fields and the state of one or more application programs with a set of rules which determine, in dependence on message fields and/or states of communicating application programs, how messages received by said system are to be processed.

6. A system according to claim 5, including a first node and a second node interconnected by a data link, said first node having means for assigning a first identifier to an outgoing message from said first node, means for maintaining a list of identifiers of the outgoing messages from said first node, and means for examining the identifiers of incoming messages and comparing with said list to identify incoming messages which are associated with said listed outgoing messages; and said second node having means for attaching a second identifier to a reply message sent from said second node in response to a received message from said first node, said second identifier being associated with said first identifier.

7. A system according to claim 6, wherein said means for attaching a second identifier comprises means for obtaining the first identifier value from a field of said message sent from said first node and inserting said identifier value in a field of the message which is sent in response.

8. A system according to claim 6, including means associated with said first node for storing a list of identifiers for received incoming messages for which there is a corresponding identifier in said list of outgoing message identifiers, thereby to identify the availability of reply messages for processing.

9. A method of supporting the processing of messages sent between application programs, the method including the steps of:

examining incoming messages to determine the type of each message;

selecting particular application program components of a modular application program to process the message, wherein the selection is performed in accordance with predefined associations between input message types and application program components and in dependence on rules for message processing which rules relate message types, dynamic characteristics associated with a message, and application program components.

10. A method according to claim 7, for supporting message processing within a distributed system, comprising assigning a first identifier to an outgoing message sent from a first node of the system, and maintaining at said first node a list of identifiers of the messages sent from said first node;

attaching a second identifier to a reply message sent from a second node of the system in response to a received message from said first node, said second identifier being associated with said first identifier; and examining the identifiers of messages arriving at said first node and comparing said identifiers with said list to identify incoming messages which are associated with said listed outgoing messages.

11. A program product recorded on a data carrier, for supporting communications between application programs, including means for supporting processing of input messages received by a system on which said program product is installed, the means for supporting processing including:

means for listing input message types;

means for listing application program components of modular application programs, which components are separately selectable;

means for identifying the type of an input message and for selecting, in accordance with predefined relationships between input message types and application program components, one or more appropriate application program components to process said input message, wherein said means for identifying and selecting supports the selection of application program components in dependence on rules for message processing which rules relate message types and dynamic characteristics associated with a message to specific application program components.

* * * * *